(12) United States Patent
Navasardyan et al.

(10) Patent No.: US 11,967,050 B2
(45) Date of Patent: *Apr. 23, 2024

(54) ONION CONVOLUTION-BASED INPAINTING OF IMAGES

(71) Applicant: PICSART, INC., San Francisco, CA (US)

(72) Inventors: Shant Navasardyan, Yerevan (AM); Marianna Ohanyan, Yerevan (AM)

(73) Assignee: PICSART, INC., Hallandale Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,494

(22) Filed: Nov. 29, 2022

(65) Prior Publication Data

US 2023/0103929 A1 Apr. 6, 2023

Related U.S. Application Data

(63) Continuation of application No. 17/745,900, filed on May 17, 2022, now Pat. No. 11,521,304.

(Continued)

(51) Int. Cl.
*G06K 9/00* (2022.01)
*G06T 5/00* (2006.01)
(Continued)

(52) U.S. Cl.
CPC ............ *G06T 5/005* (2013.01); *G06T 5/20* (2013.01); *G06T 7/12* (2017.01);
(Continued)

(58) Field of Classification Search
CPC .. G06T 5/005; G06T 7/12; G06T 5/20; G06T 2207/20076; G06T 2207/20081; G06T 2207/20084
(Continued)

(56) References Cited

U.S. PATENT DOCUMENTS 8,861,868 B2 * 10/2014 Shechtman ............. G06T 11/60
382/233
10,290,085 B2 * 5/2019 Lin ........................ G06F 18/24
(Continued)

OTHER PUBLICATIONS

Xie C, et al. (2019) Image inpainting with learnable bidirectional attention maps. In: 2019 IEEE/CVF International Conference on Computer Vision (ICCV), pp. 8857-8866.

(Continued)

*Primary Examiner* — Jonathan S Lee
(74) *Attorney, Agent, or Firm* — Arluys IP, P.C

(57) ABSTRACT

Techniques are described for inpainting of image data with a missing region. In an embodiment, at each iteration, the process determines a corresponding missing boundary region of the missing region and generates a collection of boundary patches for the missing boundary region. Based on comparing a boundary patch from the collection to source patches from a known source region of image data, the process generates replacement patches for the missing boundary region. When a boundary pixel data unit corresponds to multiple replacement pixel data units from different replacement patches, the process aggregates the multiple replacement pixel data units to generate an updated boundary pixel data unit. In an embodiment, the process performs convolution using the updated and previously known region of the image data.

20 Claims, 9 Drawing Sheets

Related U.S. Application Data

(60) Provisional application No. 63/190,104, filed on May 18, 2021.

(51) Int. Cl.
    *G06T 5/20*         (2006.01)
    *G06T 7/12*         (2017.01)

(52) U.S. Cl.
    CPC ............... *G06T 2207/20076* (2013.01); *G06T 2207/20081* (2013.01); *G06T 2207/20084* (2013.01)

(58) Field of Classification Search
    USPC ........................................................ 382/159
    See application file for complete search history.

(56) References Cited

U.S. PATENT DOCUMENTS

| | | |
|---|---|---|
| 2017/0024864 A1 | 1/2017 | Karande |
| 2021/0150678 A1 | 5/2021 | Yi |

OTHER PUBLICATIONS

Efros AA, et al. (2001) Image quilting for texture synthesis and transfer. In: Proceedings of the 28th Annual Conference on Computer Graphics and Interactive Techniques, Association for Computing Machinery, New York, NY, USA, SIGGRAPH '01, p. 341-346, DOI 10.1145/383259.383296, URL https://doi.org/10.1145/383259.383296.

Yan Z, et al. (2018) Shift-net: Image inpainting via deep feature rearrangement. In: The Euro pean Conference on Computer Vision (ECCV).

Efros A, et al. (1999) Texture synthesis by nonparametric sampling. In: IEEE International Conference on Computer Vision, Corfu, Greece, Sep. 1999.

Zhou B, et al. (2017) Places: A 10 million image database for scene recognition. IEEE transactions on pattern analysis and machine intelligence 40(6):1452-1464.

Harrison P (2001) A non-hierarchical procedure for resynthesis of complex textures. In: Skala V (ed) Proceedings of The 9-th International Conference in Central Europe on Computer Graphics, Visualization and Computer Vision'2001, University of West Bohemia, pp. 190-197, URL http://wscg.zcu.cz/wscg2001/wscg2001.htm, international Conferences in Central Europe on Computer Graphics, Visualization and Computer Vision 2001, WSCG 2001 ; Conference date: May 2, 2001 Through Sep. 2, 2001.

Kingma DP, et al. (2015) Adam: A method for stochastic optimization. CoRR abs/1412.6980.

Vaswani A, et al. (2017) Attention is all you need. In: Advances in Neural Information Processing Systems 30, Curran Associates, Inc., pp. 5998-6008, URL http://papers.nips.cc/paper/7181-attention-is-all-you-need.pdf.

Liu H, et al. (2019) Coherent Semantic Attention for Image Inpainting. In: 2019 IEEE/CVF International Conference on Computer Vision (ICCV), pp. 4170-4179.

Pathak D, et al. (2016) Context encoders: Feature learning by inpainting. In: 2016 IEEE Conference on Computer Vision and Pattern Recognition (CVPR), pp. 2536-2544.

Song Y, et al. (2018) Contextual-based image inpainting: Infer, match, and translate. In: Proceedings of the European Confer Conference on Computer Vision (ECCV), pp. 3-19.

Nazeri K, et al. (2019) Edgeconnect: Generative Image Inpainting with Adversarial Edge Learning. In: ICCV Workshops.

Hung J, et al. (2008) Exemplar-based image inpainting base on structure construction. In: Journal of Software 3, DOI 10.4304/jsw.3.8.57-64.

Clevert DA, et al. (2015) Fast and accurate deep network learning by exponential linear units (elus). CoRR abs/1511.07289.

Boykov Y, et al. (2001) Fast approximate energy minimization via graph cuts. IEEE Transactions on Pattern Analysis and Machine Intelligence 23(11):1222-1239.

Chen TQ, et al. (2016) Fast patch-based style transfer of arbitrary style. arXiv preprint arXiv:161204337.

Wei LY, et al. (2000) Fast texture synthesis using treestructured vector quantization. In: Proceedings of the 27th Annual Conference on Computer Graphics and Interactive Techniques, ACM Press/Addison-Wesley Publishing Co., USA, SIGGRAPH '00, p. 479-488, DOI 10.1145/344779.345009, URL https://doi.org/10.1145/344779.345009.

Xiong W, et al. (2019) Foreground-aware image inpainting. In: The IEEE Conference on Computer Vision and Pattern Recognition (CVPR).

Yu J, et al. (2019) Freeform image inpainting with gated convolution. In: 2019 IEEE/CVF International Conference on Computer Vision (ICCV), pp. 4470-4479.

Goodfellow IJ, et al. (2014) Generative adversarial nets. In: Proceedings of the 27th International Conference on Neural Information Processing Systems—vol. 2, MIT Press, Cambridge, MA, USA, NIPS'14, p. 2672-2680.

Yu J, et al. (2018) Generative image inpainting with contextual attention. In: 2018 IEEE/CVF Conference on Computer Vision and Pattern Recognition, pp. 5505-5514.

Iizuka S, et al. (2017) Globally and locally consistent image completion. ACM Transactions on Graphics 36:1-14, DOI 10.1145/3072959.3073659.

Kwatra V, et al. (2003) Graphcut textures: Image and video synthesis using graph cuts. ACM Trans Graph 22:277-286, DOI 10.1145/1201775.882264.

Yang C, et al. (2016) High-resolution image inpainting using multi-scale neural patch synthesis. arXiv preprint arXiv:161109969v2.

Huang JB, et al. (2014) Image completion using planar structure guidance. ACM Trans Graph 33(4), DOI 10.1145/2601097.2601205, URL https://doi.org/10.1145/2601097.2601205.

Sun J, et al. (2005) Image completion with structure propagation. ACM Trans Graph 24(3):861-868, DOI 10.1145/1073204.1073274, URL https://doi.org/10.1145/1073204.1073274.

Xie J, et al. (2012) Image denoising and inpainting with deep neural networks. In: Proceedings of the 25th International Conference on Neural Information Processing Systems—vol. 1, Curran Associates Inc., Red Hook, NY, USA, NIPS'12, p. 341-349.

Liu G, et al. (2018) Image inpainting for irregular holes using partial convolutions. In: ECCV Luong T, Pham H, Manning CD (2015) Effective approaches to attention-based neural machine translation. In: Proceedings of the 2015 Conference on Empirical Methods in Natural Language Processing, Association for Computational Linguistics, Lisbon, Portugal, pp. 1412-1421, DOI 10.18653/v1/D15-1166, URL https://www.aclweb.org/anthology/D15-1166.

Bertalmio M, et al. (2000) Image inpainting. In: SIGGRAPH '00.

Zhou Wang, et al. (2004) Image quality assessment: from error visibility to structural similarity. IEEE Transactions on Image Processing 13(4):600-612.

Gatys LA, et al. (2016) Image style transfer using convolutional neural networks. In: Proceedings of the IEEE conference on computer vision and pattern recognition, pp. 2414-2423.

Kohler R, et al. (2014) Mask-specific inpainting with deep neural networks. In: German Conference on Pattern Recognition, Springer International Publishing, Cham, pp. 523-534.

Criminisi A, et al. (2003) Object removal by exemplar-based inpainting. vol 2, pp. 721-728, DOI 10.1109/CVPR.2003.1211538, URL https://www.microsoft.com/en-us/research/wp-content/uploads/2016/02/criminisi_cvpr2003.pdf.

Barnes C, et al. (2009) PatchMatch: A randomized correspondence algorithm for structural image editing. ACM Transactions on Graphics (Proc SIGGRAPH) 28(3) Bello I, et al. (2019) Attention augmented convolutional networks. In: 2019 IEEE/CVF International Conference on Computer Vision (ICCV), pp. 3285-3294.

Zheng C, et al. (2019) Pluralistic image completion. 2019 IEEE/CVF Conference on Computer Vision and Pattern Recognition (CVPR) pp. 1438-1447.

(56) References Cited

OTHER PUBLICATIONS

Lin Liang (2001) Real-Time Texture Synthesis by Patch-Based Sampling. In: ACM Transactions on Graphics, vol. 20, No. 3, Jul. 2001, pp. 127-150.
Criminisi A, et al. (2004) Region filling and object removal by exemplar-based image inpainting. Trans Img Proc 13 (9):1200-1212, DOI 10.1109/TIP. 2004.833105, URL https://doi.org/10.1109/TIP.2004.833105.
Zhang H, et al. (2019) Self-attention generative adversarial networks. In: Proceedings of the 36th International Conference on Machine Learning, PMLR, Long Beach, California, USA, Proceedings of Machine Learning Research, vol. 97, pp. 7354-7363, URL http://proceedings.mlr.press/v97/zhang19d.html.
Yeh RA, et al. (2017) Semantic image inpainting with deep generative models. In: 2017 IEEE Conference on Computer Vision and Pattern Recognition (CVPR), pp. 6882-6890.
Ren JSJ, et al. (2015) Shepard convolutional neural networks. In: Advances in Neural Information Processing Systems 28 (NIPS 2015).
Bertalmio M, et al. (2003) Simultaneous structure and texture image inpainting. IEEE Transactions on Image Processing 12(8):882-889.
Miyato T, et al. (2018) Spectral normalization for generative adversarial networks. In: International Conference on Learning Representations, URL https://openreview.net/forum?id=B1QRgziT.
Song Y, et al. (2018) Spg-net: Segmentation prediction and guidance network for image inpainting. CoRR abs/1805.03356, URL http://arxiv.org/abs/1805.03356, 1805.03356.
Ashikhmin M (2001) Synthesizing natural textures. In: Proceedings of the 2001 Symposium on Interactive 3D Graphics, Association for Computing Machinery, New York, NY, USA, I3D '01, p. 217-226, DOI 10.1145/364338.364405, URL https://doi.org/10.1145/364338.364405.
Neuhold G, et al. (2017) The Mapillary Vistas Dataset for Semantic Understanding of Street Scenes. In: 2017 IEEE/CVF Conference on Computer Vision and Pattern Recognition, pp. 4990-4999.
Simonyan K, et al. (2015) Very deep convolutional networks for large-scale image recognition. In: Bengio Y, LeCun Y (eds) 3rd International Conference on Learning Representations, ICLR 2015, San Diego, CA, USA, May 7-9, 2015, Conference Track Proceedings, URL http://arxiv.org/abs/1409.1556.
Oh, Seoung Wug, et al. "Onion-peel networks for deep video completion." Proceedings of the IEEE/CVF International Conference on Computer Vision. 2019.(Year: 2019).
Zhang, Haoran, et al. "Semantic image inpainting with progressive generative networks." Proceedings of the 26th ACM International conference on Multimedia. 2018. (Year: 2018).
Guo, Zongyu, et al. "Progressive image inpainting with full-resolution residual network." Proceedings of the 27th ACM International conference on Multimedia. 2019. (Year: 2019).
Li, Jingyuan, et al. "Progressive reconstruction of visual structure for image inpainting." Proceedings of the IEEE/CVF International Conference on Computer Vision. 2019 (Year: 2019).
Barnes, Connelly, et al. "The patchmatch randomized matching algorithm for image manipulation." Communications of the ACM 54.11 (2011): 103-110. (Year: 2011).

\* cited by examiner

ONION CONVOLUTION-BASED INPAINTING OF IMAGES

BENEFIT CLAIM

This application claims the benefit under 35 U.S.C. § 120 as a continuation of application Ser. No. 17/745,900, filed May 17, 2022, which claims the benefit under 35 U.S.C. § 119(e) of provisional patent application 63/190,104, filed May 18, 2021, the entire contents each of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE TECHNOLOGY

The present invention relates to the field of image processing, in particular to onion convolution-based inpainting of images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Image inpainting techniques of image processing are necessary for the recovery and repair of missing or damaged portions of an image. A large number of digital images that are produced by digitalizing film photography include damaged portions. Such damaged portions may be the result of the physical wear and tear of the photograph or the usage of subpar/antiquated photographic or scanning equipment. The damage may include cracks, worn-out portions, and/or over-exposed/under-exposed areas.

More importantly, image inpainting techniques are necessary for digital image editing for object removal from a digital image. Indeed, many state-of-the-art photo-editing tools allow a user to mask one or more objects within a digital image and perform object removal. The region of the image after the object removal, the missing region, has to be inpainted to restore the image.

Such restored image has to be visually plausible; thus, the inpainting techniques have to yield an output that:
  has semantically correct logic, i.e., the generated objects or their parts should be logically possible.
  preserves the structures in the image after the inpainting; i.e., the lines and curves in the known region should be continued to the generated region.
  generates textures that are visually realistic and coherent with the textures in the known region.

For example, one set of inpainting approaches is based on texture synthesis techniques and is successful in meeting the realistic-look texture criterion. Due to the patch-based nature, these approaches may also meet the criterion of preserving structural continuities. However, for complex structures, these approaches fail to achieve semantically correct outputs.

To remedy this failure, deep machine learning techniques with vanilla convolutions may be used. Because the convolution operations use sliding windows of pixels to operate on, the missing or invalid pixels in the sliding windows are treated as useful information by the operation. Accordingly, while these approaches achieve semantically meaningful results for small missing regions in images, for complex real-world images, these approaches may introduce blur, structural distortions, edge artifacts, and color inconsistencies.

On the other hand, the special blocks approaches may avoid the issue of invalid/missing information by ignoring the values of the missing region in images. However, by just ignoring the missing pixels, these specially designed blocks process only local neighborhoods of missing pixels instead of analyzing larger regions. Such processing causes difficulties in obtaining semantically meaningful results. Accordingly, the approach may introduce distortion into the restored region for complex images.

Furthermore, the above-mentioned approaches may complete the missing region in a one-shot manner in which all missing pixels are filled simultaneously without any order. However, the one-shot approaches lead to structural distortions. For example, deep learning networks may fail to progressively make continuity-preserving coarse estimations, which leads to output images with structural discontinuities.

BRIEF DESCRIPTION OF THE DRAWINGS

In the drawings of certain embodiments in which like reference numerals refer to corresponding parts throughout the figures.

DETAILED DESCRIPTION

Figure 1:
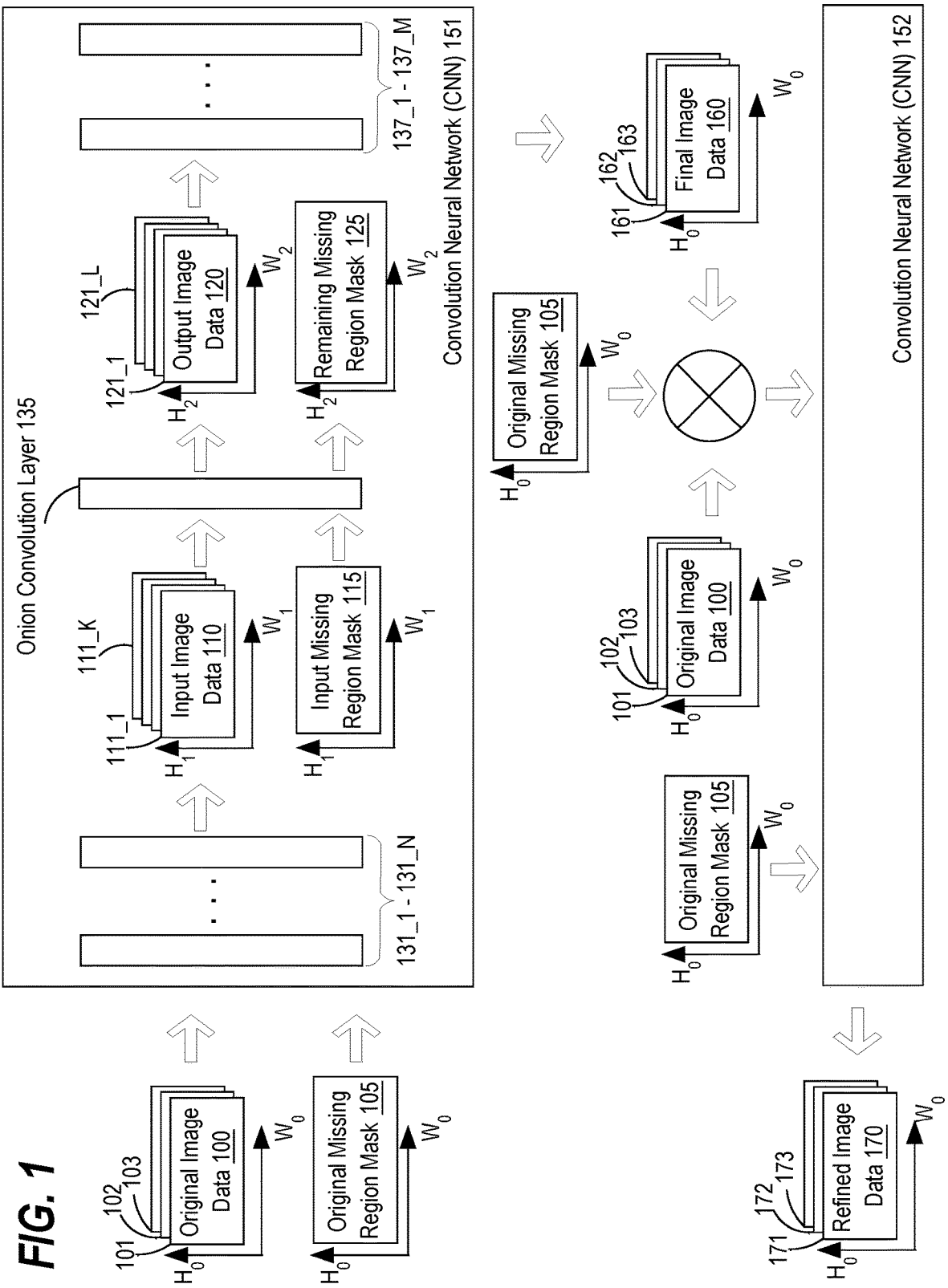
FIG. 1 is a block diagram depicting data flow and a system for an example machine learning implementation of image inpainting, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe onion-convolution based inpainting of digital images. To inpaint a missing region, a contour region of the missing region is determined. The term "contour region" or "missing boundary" or "boundary region" refers herein to the area of a missing region of the digital image that includes contiguously arranged pixel data units that include pixel data units that neighbor known pixel data units from the known region. The term "pixel data unit" refers to the data that represents a pixel in a digital image and may contain multiple data values, each corresponding to a different channel. For example, a pixel data unit that represents an RGB pixel may contain three different channel values for respective red, green, and blue colors channels. In other examples, a pixel data unit of a pixel may contain greater or fewer channel values than the original channel values representing the pixel for the corresponding greater or fewer number of channels. Such channel values may be one or more transformations of the original channel values representing the pixel. The term "boundary pixel unit" refers to the pixel data unit that is part of the missing boundary.

Techniques described herein may compare patches that include unknown pixel data unit(s) from the missing boundary to the patches that include known pixel data units. The term "patch" refers herein to a collection of pixel data units that represent a contiguous area of pixels in the digital image. A patch may be formed by specifying a central pixel data unit of image data and including other pixel data unit(s) of the image data that are contiguously arranged around the central pixel data unit (e.g., a square of pixel data units).

A source patch is a patch with a known pixel data unit as a central pixel data unit. In an embodiment, a collection of source patches is generated by including known pixel data unit(s) that are in the neighborhood of the missing region of the image data (e.g., within a range of pixel-wise distances from the missing region). Based on such pixel-wise range from the missing boundary, the process may select a source region of known pixel data units from the known region of the image data. Using each known central pixel data unit in the source region, a corresponding source patch is generated, thereby generating a collection of source patches.

Unlike a source patch, a boundary patch is a patch generated based on specifying a boundary pixel data unit as a central pixel data unit of a patch. A boundary patch may include other boundary pixel data unit(s) and adjoining pixel data unit(s) (which may be known or unknown), according to one or more embodiments.

Based on comparing a collection of source patches with a boundary patch, a replacement patch(es) of pixel data units is generated for the boundary patch. In one or more embodiments, the level of similarity between source patches and a boundary patch determines how much a pixel data unit of the replacement patch is based on the pixel data unit(s) of the source patches and/or how likely (probability of) that the corresponding pixel data unit(s) of a particular source patch are selected for the replacement patch. In an embodiment in which multiple pixel data units, each from a different replacement patch, correspond to a particular boundary pixel data unit, an aggregation of the multiple replacement pixel data units is performed to determine the corresponding boundary pixel data unit.

In an embodiment, the next missing boundary is identified in the same image data after the replacement pixel data unit(s) are generated for the current missing boundary. The new missing boundary may be selected such that the new missing boundary borders the previous missing boundary and is encompassed by the previous missing boundary. For example, the new missing boundary may include pixel data units of the missing region, which are not in the current missing boundary but have pixel data units that neighbor the current missing boundary. In the new iteration, the next collection of boundary patches is generated and compared with the same and/or new collection of source patches. A new set of replacement pixel data units are generated for the new missing boundary pixel data units based on the techniques described herein.

In an embodiment, the source region may also change in the next iteration. In such an embodiment, the next source region may be selected such that it includes new known pixel data units that have not been used in the previous iteration. Thus, the new source region may have a further greater pixel-wise range of distance from the previous missing boundary than the previous source region. The new collection of source patches is compared with the new collection of boundary patches to determine the replacement pixel data units for the new missing boundary.

In an embodiment, the process may perform such iterations until missing boundaries are exhausted from the missing region of the image data. Stated differently, the last missing boundary region encompasses no unknown pixel data units. Additionally or alternatively, the number of iterations is limited to a particular number.

In an embodiment, after replacing the missing region with the replacement pixel data units, convolution is performed. The convolution may exclude the unknown pixel data units in the remaining missing region if any continue to exist. As the convolution may process also unknown pixel data units that neighbor known pixel data units, the remaining missing region is expanded to indicate such neighboring known pixels as unknown for later layers. In an embodiment, the weights of the convolution are training parameters for a neural network machine learning algorithm that includes one or more convolution layers that perform the convolution(s) on the image data.

Machine Learning System

FIG. 1 is a block diagram depicting data flow and a system for an example machine learning implementation of image inpainting, in one or more embodiments. Input for the system is original image data 100, which includes channels 101, 102, and 103 of an initial pixel-wise size of $H_0$ and $W_0$. Each of channels 101, 102, and 103 may correspond to channel values for red, green, and blue pixels. Other types of image data may also be used by the system, such as image data containing CMYK channels for pixels.

Missing region of image data 100 may include one or more connected components (e.g., subregion(s) of the missing region), each connected component represented by zero values for channel values in channels 101, 102, and 103. Additionally, original missing region mask 105 is provided. The original missing region mask is a matrix of the same size of height $H_0$ and width $W_0$ as image data 100, having values of one (1) for the missing region(s) and zero (0) for known regions on the locations. The locations of values of one correspond to the missing regions and the locations of values of zero to the known regions, respectively, in image data 100.

Figure 2:
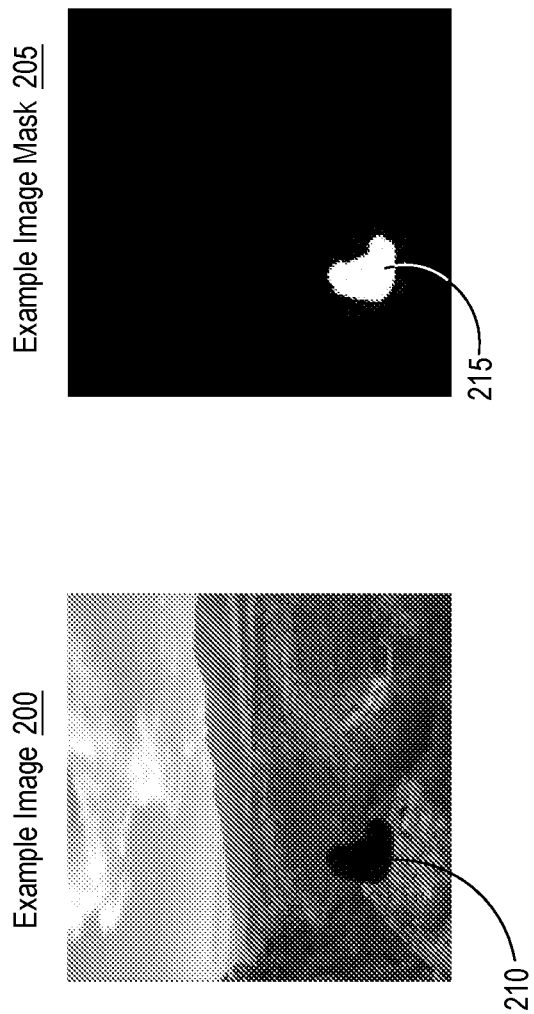
FIG. 2 depicts an original image and an original image mask, in an embodiment.

FIG. 2 depicts an original image and an original image mask, in an embodiment. Example image 200 (having RGB channels although depicted in grayscale) has a missing region, region 210. Missing region 210 of example image 200 is also represented in example image mask 205. Example image mask 205 contains 1's and 0's, in which 1's are depicted in black and in white. Missing region 210 of image 200 corresponds to missing region 215 in example image mask 205.

Continuing with FIG. 1, original image data 100 and original missing region mask 105 are provided to a machine learning system that implements a machine learning algorithm such as convolutional neural network 151. CNN 151 may contain multiple convolution layers which perform various convolutions with different strides and using different filters of various sizes. The filter values may be trainable parameters that are trained using training data set of images and image masks. Such trainable parameters may be trained for the whole CNN, all layers at once.

CNN 151 contains onion convolution layer 135, layers 131_1 through 131_N, and layers 137_1 through 137_M include (special) convolution (e.g., partial convolution) and/or other types of processing layers, in which N and M are numbers denoting the corresponding number of layers in CNN 151. Other embodiments are possible, in which either layers 131_1 through 131_N are not implemented or layers 137_1 through 137_M are not implemented.

When a convolution is performed on image data in a convolution layer, the size and channels of the image data may change. For example, in FIG. 1, one or more convolution layers of layers 131_1 ... N perform convolutions on original image data 100, which may produce input image data 110 with a different size $H_1/W_1$ and different channels 111_1 through 111_K. The channel values of K channels 111_1 ... K are derivatives of the original channels 101 ... 103 of original image data 100. The channel values of the output of layers 131_1 ... N that have not been determined are indicated by input missing region mask 115. Input missing region mask 115 may be generated by resizing the original missing region mask 105 from $H_0/W_0$ to $H_1/W_1$. Additionally or alternatively, the missing region in the image data may have changed due to the resizing that occurs in the convolutions of layers 131_1 ... N.

Accordingly, onion convolution layer 135 that performs the techniques of onion patch matching described herein may receive input image data, such as input image data 110, that has a different size and/or channels from the original image.

Onion convolution layer 135 provides output image data 120, which in some embodiments may have different size $H_2/W_2$ and/or channel 121_1 through 121_L than input image data 110. Remaining missing region mask 125 that is produced by onion convolution layer 135 may indicate the remaining unknown pixel data units that have not been filled (if any). Additional convolutions may be performed on output image data 120 by convolution layers 137_1 through 137_M for CNN 151 to output final image data 160. Final image data 160 is the output of CNN 151 and has the same size H0/W0 and the same number of channels, albeit with the corresponding channel values in channels 161, 162, and 163.

In an embodiment, the inpainting system may contain multiple CNNs. For example, one CNN may produce a course output image data, at least a portion of which data is provided as input to the next CNN. The next CNN produces refined output image data. In an embodiment, final image data 160 is combined with original image data 100 such that the pixel data units for the missing region indicated by original missing region mask 105 are selected from final image data 160. The rest of the pixel data units are selected from original image data 100. The combined image data, along with original missing region mask 105, is provided as input to CNN 152. CNN refines the input image data to output refined image data 170 having the same number of channels (171, 172, and 173) as original image data 100.

Missing Boundary Patches

In an embodiment, the input mask indicates the unknown pixel data units in the input image data, thereby indicating the missing region(s) in the input image data. The input image data may be represented as a tensor $X \in R^{H \times W \times c}$ and the binary mask $M \in \{0, 1\}^{H \times W}$ in which H and W are the height and width of the image and c is the number of channels.

Figure 3:
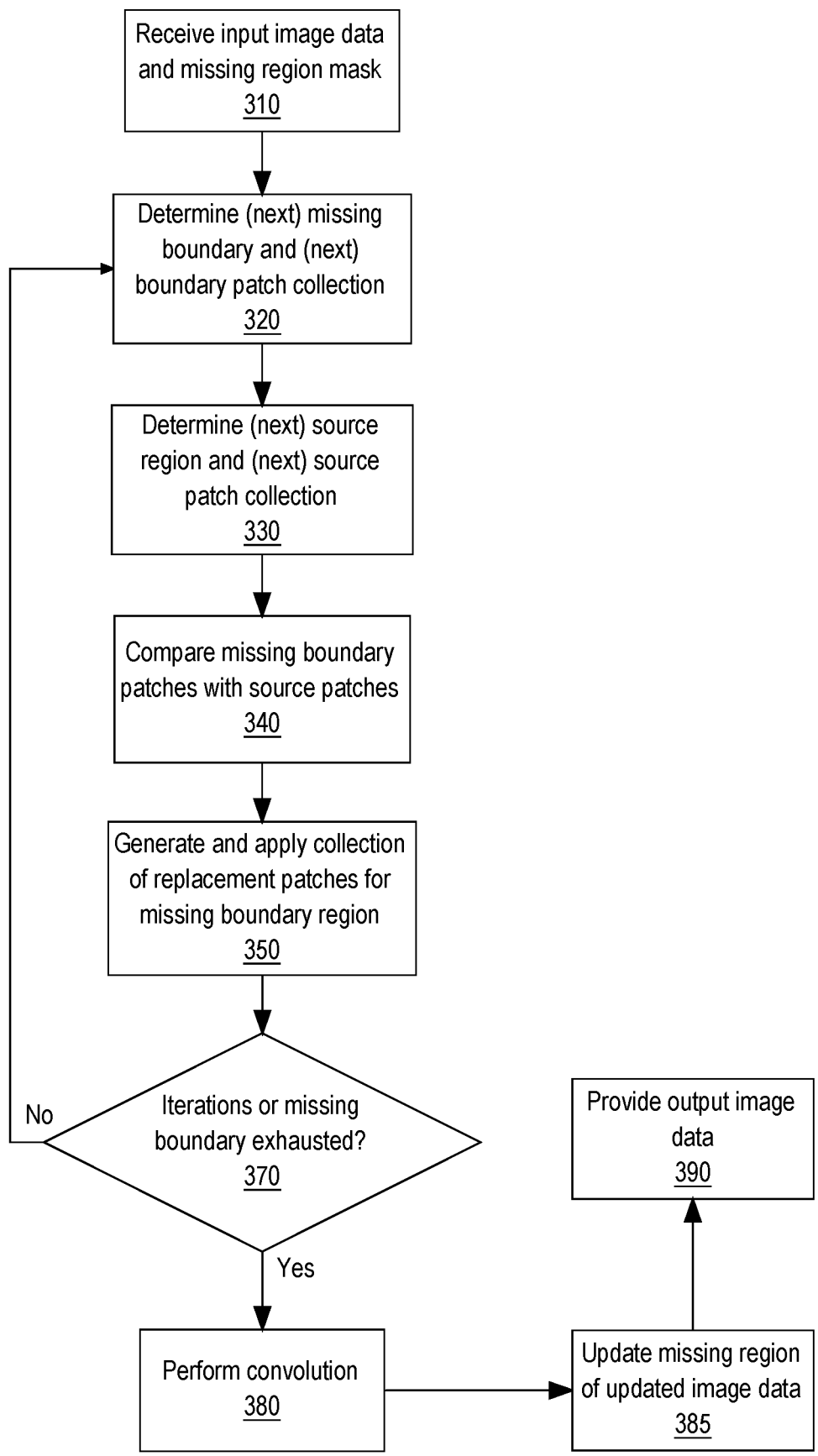
FIG. 3 is a flow diagram that depicts a process of onion convolution, in one or more embodiments.

FIG. 3 is a flow diagram that depicts a process of onion convolution, in one or more embodiments. One or more of the steps described below may be omitted, repeated, and/or performed in a different order. Accordingly, the specific arrangement of steps shown in FIG. 3 should not be construed as limiting the scope of the invention. Further, the steps shown below may be modified based on the data structure used to store the image data.

At step 310, the process receives input image data and the mask for the unknown pixel data units (i.e., the missing region(s)). The process performs iterations of image inpainting to fill the missing region of the input image data. The iterations may be denoted by t=1, ..., T.

At step 320, the process determines the missing boundary and the missing boundary patch collection for an iteration. In each iteration, a missing region boundary, OM t, of the missing region, $M^t$, is determined and is filled, resulting in an updated tensor, $X^{t+1}$, with a lesser size of a missing region denoted by an example equation: $M^{t+1}=M^t-\partial M^t$.

To determine the missing boundary region of pixel data units, the missing region mask may be eroded to yield a new missing region mask that has a smaller missing region indicated than the original missing region mask. The size of contraction for the missing region is based on the size of an erosion window applied to the mask. The erosion may be represented by an example equation: erode $(M^t, k_j)$, in which $k_j \times k_j$ is the size of the erosion window. For example, the erosion window may have a size of three-by-three pixel data units.

The operation of erosion converts the central value of the erosion window to the minimum value that exists within the erosion window as applied to an area of a mask (matrix or tensor). Any particular location within the erosion window may be specified as the central value for the erosion process beforehand, preferably the center value. However, other location values may be specified, in particular for the window size that does not have a center location (e.g., two-by-two or four-by-four). The erosion window is slid across the mask values, at least until each value of the missing region area of the mask has been the central value, in an embodiment.

Figure 4:
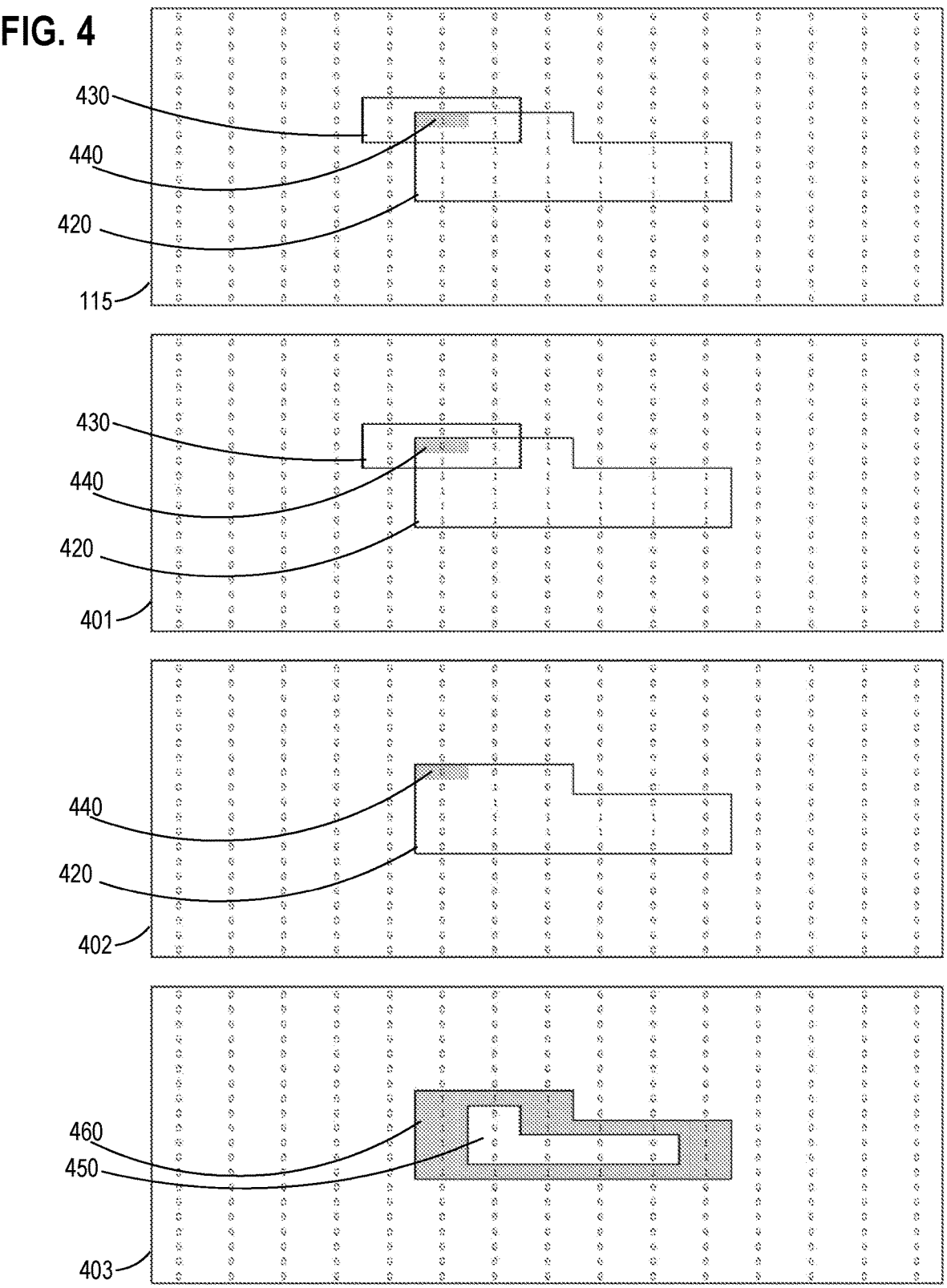
FIG. 4 is a diagram that depicts a sequence of erosion steps to determine a missing boundary using an example erosion window, in an embodiment.

FIG. 4 is a diagram that depicts a sequence of erosion steps to determine a missing boundary using an example erosion window of three-by-three (3×3) size in an embodiment. The process applies erosion window 430 on input region mask 115. Erosion window 430 is applied for the central value that is located in the exact center of the three-by-three window, e.g., 440. At the point at which the erosion window has the central value as one of the boundary values of missing region 420, such as value 440, window 430 also contains values in the known region which are denoted as zeros in the mask. Accordingly, for the central values on the boundary of the missing region, when the process takes the minimum of the window, the boundary value changes from one to zero. Accordingly, for window 430, the process calculates central value 440 by taking the minimum of window 430 values. Thus, the process produces a change of value 440 from one (1) to zero (0), as depicted in transformed mask 401.

After the process applies erosion window 430 to missing region 420, the values in missing region 420 are updated such that the values bordering (or in proximity) of the values indicating the known region are updated to zeros, including value 440, as depicted in mask 402.

To generate a new mask specifying only the boundary values with ones, in an embodiment, the eroded mask may be subtracted from the original mask. Indeed, if mask 402 is subtracted from input missing region mask 115, the process yields missing boundary mask 403, which includes missing boundary 460 with only boundary values having the value of one (1), and the remaining missing region 450 as well as the known region marked with the values of zero (0). The determination of the missing boundary may be represented by an example equation: $\partial M^t = M^t - \text{erode}(M^t, k_l)$, in which the original missing region is $M^t$, and $k_l \times k_l$ is the size of erosion window, e.g., three-by-three pixels.

Although the example erosion process in FIG. 4 used an erosion window of size three-by-three, other size windows may be used for a missing boundary region to produce a missing region mask with a greater number of pixel data units in thickness. For example, if a five-by-five erosion window with a center-based central value is used, the missing boundary region for each iteration would be two (2) pixel data units wide.

For each iteration, a collection of boundary patches is identified, in an embodiment. The determined missing boundary region mask indicates the boundary pixel data units in the input image data. Each one or more of the boundary pixel data units may be selected as the central pixel data units to identify a corresponding patch. For example, each boundary pixel data unit may be the central pixel data unit of the patch of a specified size that includes other pixel data units of the image data contiguously arranged around the central pixel data unit. Any particular location within the patch may be specified as the central pixel data unit for the missing boundary collection patches, preferably the center location. However, other locations may be specified as the central location as well (e.g., upper leftmost or bottom rightmost location), particularly for a patch size that does not have a center location (e.g., two-by-two or four-by-four).

For example, to create a collection of boundary patches for an iteration, each boundary pixel data unit, as indicated by the missing boundary region mask, is selected as the central pixel data unit. The patch further includes surrounding pixel data units from the input image data forming a $k_m \times k_m$ size patch. For example, a patch may include a $k_m \times k_m$ neighborhood of pixel data units around the center pixel data unit. Accordingly, in an iteration, the collection of boundary patches includes tensors for each location p, for which $\partial M_p^t = 1$ in tensor $X^t$, denoted as $\text{patch}_X^{k_m}(p)$.

Source Patches

Continuing with FIG. 3, at step 330, the process determines the source region and the source patch collection for an iteration. To determine the source region of pixel data units to compare to the boundary region, the missing region mask may be dilated to yield a new missing region mask that has a larger missing region indicated than the original missing region mask. The size of the expansion for the missing region is based on the size of a dilation window applied to the mask. The dilation may be represented by an example equation: $\text{dilate}(M_t, \text{dil})$, in which dil×dil is the size of the dilation window.

The operation of dilation converts the central value of the dilation window to the maximum value that exists within the dilation window. Any particular location within the dilation window may be specified as the central value for the dilation process (e.g., center value, upper-leftmost value, or bottom-rightmost value), preferably the center value, but other location values may be specified, in particular for the window size that does not have a center location (e.g., two-by-two or four-by-four). The dilation window is slid across the mask values, at least until each value of the missing region area of the mask has been within the window, in an embodiment.

Figure 5:
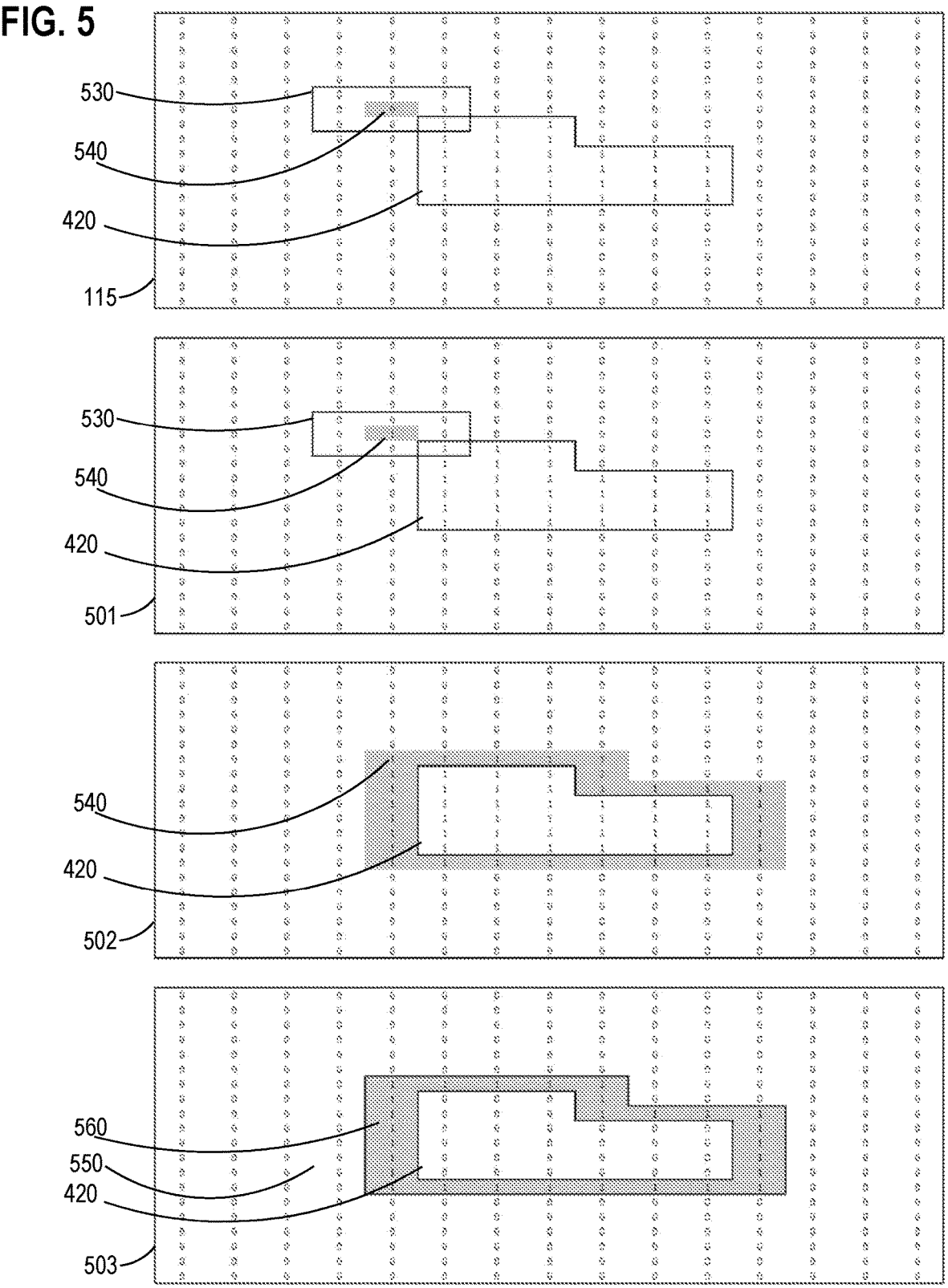
FIG. 5 is a diagram that depicts a sequence of dilation steps to determine a source region using an example dilation window, in an embodiment.

FIG. 5 is a diagram that depicts a sequence of dilation steps to determine a source region using an example dilation window of three by three (3×3), in an embodiment. The process applies dilation window 530 on input region mask 115. Dilation window 530 is applied for the central value that is located in the exact center of the three-by-three window, such as value 540. When the dilation window includes at least one of the boundary values of missing region 420, such as value 540, the central value of window 530, 540, may be in the known region having the value of zero. When the process takes the minimum of window 430 to calculate central value 540, the process produces a change of value 440 from zero (0) to one (1), as depicted in transformed mask 501.

After the process applies dilation window 530 to missing region 420, the values in the known region are updated such that the values bordering (or in proximity) of the boundary region are updated to ones, as depicted in mask 502.

To generate a new mask specifying only the source region, the original missing region mask may be subtracted from the dilated mask. Indeed, if input missing region mask 115 is subtracted from mask 502, the process yields source region mask 503, which includes known source region 560 with only source region values having the value of one (1), and the remaining known region 550 as well as missing region 420 marked with the values of zero (0). The determination of the source region may be represented by an example equation: $\overline{M_t} = \text{dilate}(M^t, \text{dil}) - M^t$, in which the original missing region is $M^t$, and dil×dil is the size of the dilation window.

Although the example dilation process in FIG. 5 used a dilation window of size three-by-three, other size windows may be used for determining a source region with a greater number of pixel data units. For example, if an eight-by-eight dilation window is used with the central values as the upper-leftmost value, the source region would be eight (8) pixel data units wide.

In an embodiment, the process determines a source region once for all iterations, and therefore, step 330 in FIG. 3 is only performed once and omitted in the next iteration(s). In another embodiment, for each iteration, a new source region is similarly determined.

The determined source region mask indicates the source pixel data units used for matching the corresponding pixel data units with those of the missing boundary for the input image data. Each one or more of the source pixel data units may be selected to identify a corresponding source patch. For example, each source pixel data unit may be the central pixel data unit of the source patch of a specified size that includes other pixel data units of the image data contiguously arranged around the central pixel data unit. Any particular location within the patch may be specified as the central pixel data unit for the source patch collection, preferably the center location. However, other locations may be specified as a central location as well (e.g., upper leftmost or bottom rightmost location), particularly for a patch size that does not have a center location (e.g., two-by-two or four-by-four patch sizes).

For example, to create a collection of source patches, each source pixel data unit, as indicated by the source region mask, is selected as the central pixel data unit. Such a source patch further includes as many of the central pixel data unit's surrounding pixel data units from the input image data as to form a km×km size patch. Accordingly, the collection of source patches may be represented for each location $\hat{p}$, $\{\text{patch}_{X^t}^{k_m}(\hat{p}) | \overline{M^t}_{\hat{p}} = 1\}$ having a patch size of km×km.

Comparing Boundary Patches with Source Patches

Continuing with FIG. 3, at step 340, the process compares the missing boundary patch collection of a missing boundary region with the source patch collection of the source region. For each new iteration, sine a new missing boundary region is determined, a new collection of missing boundary patches is identified and compared with a source patch collection.

In an embodiment, each missing boundary patch in the collection is compared to each and every source patch of the source patch collection. The source region and, thus, the source patch collection may also vary for iterations. In an embodiment in which a new source patch collection is identified for each iteration, the source patch collection of the iteration is used in performing the comparison with each boundary patch of that iteration.

Figure 6:
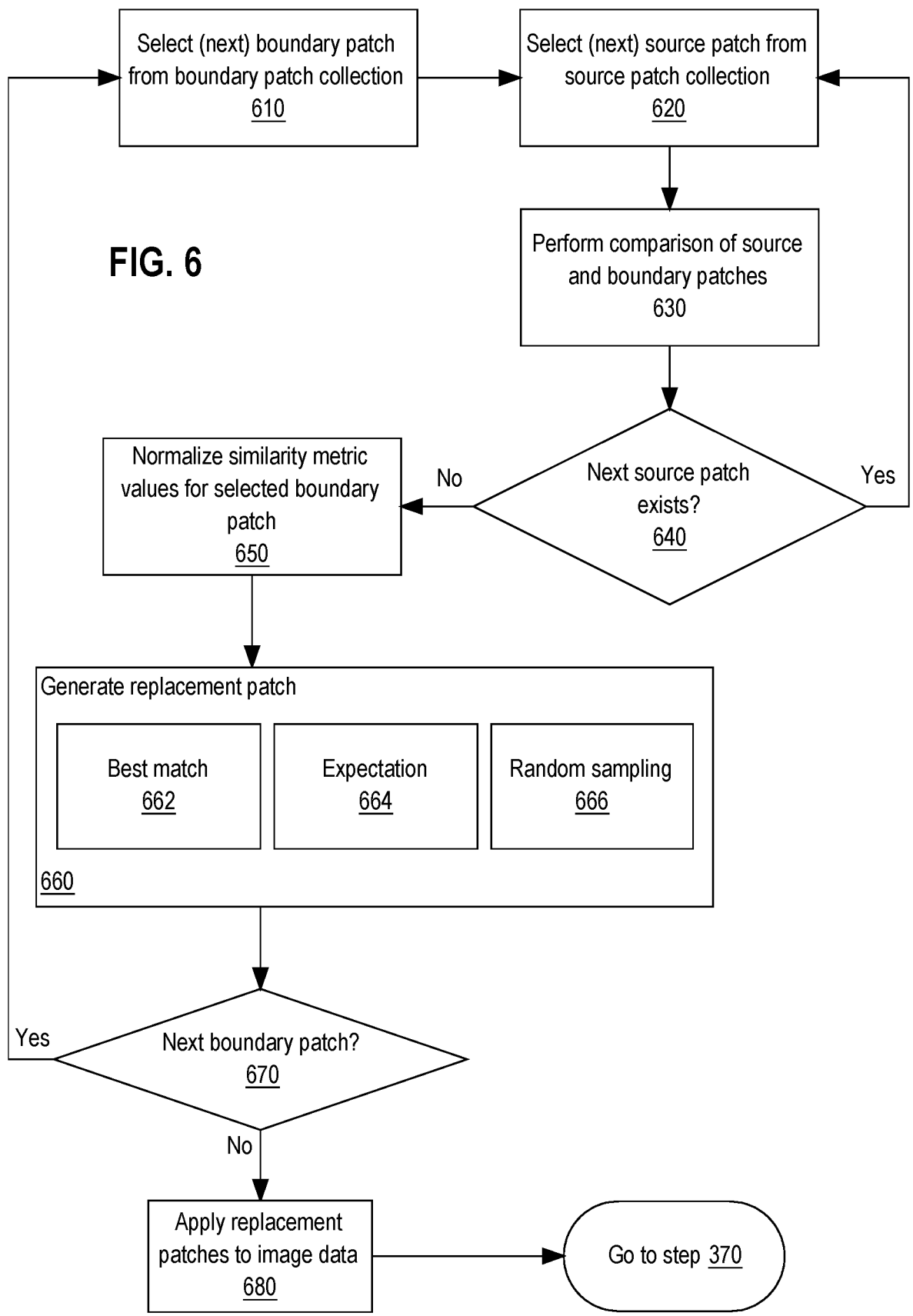
FIG. 6 is a flow diagram that depicts a process for performing an iteration of comparing boundary patch(es) in a boundary patch collection of a boundary region with source patch(es) of the source region, in one or more embodiments.

FIG. 6 is a flow diagram that depicts a process for performing an iteration of comparing boundary patch(es) in a boundary patch collection of a boundary region with source patch(es) of the source region, in one or more embodiments. One or more of the steps described below may be omitted, repeated, and/or performed in a different order. Accordingly, the specific arrangement of steps shown in FIG. 6 should not be construed as limiting the scope of the invention. Further, the steps shown below may be modified based on the data structure used to store the image data.

Figure 7:
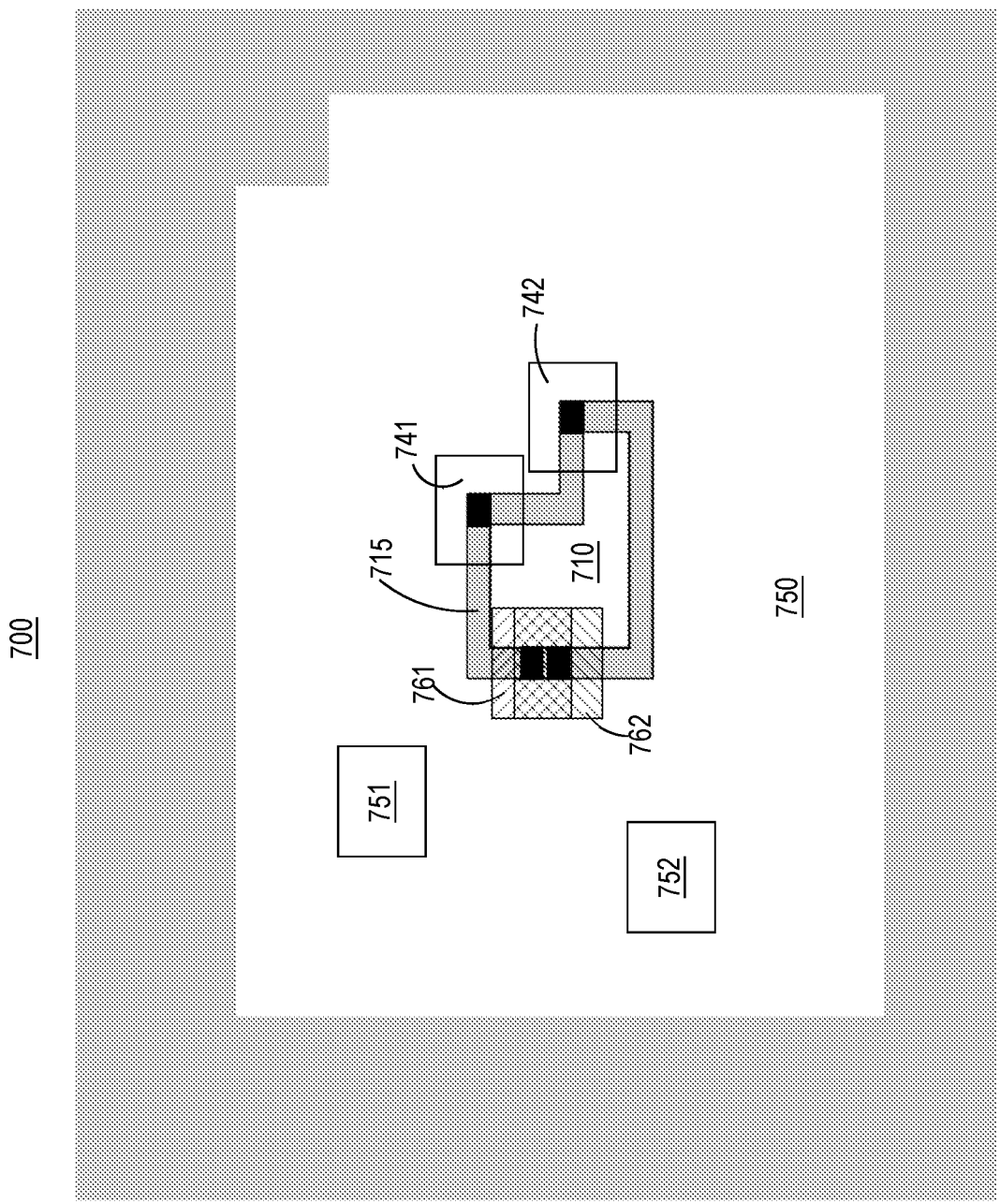
FIG. 7 is a block diagram that depicts example input image data with a source and a boundary region for an iteration, in an embodiment.

FIG. 7 is a block diagram that depicts example input image data 700 with source region 750 and boundary region 715 for an iteration, in an embodiment. Boundary region 715's collection of patches includes boundary patch 741 and boundary patch 742. Source region 750 includes source patches 751 and 752 for comparing with the collection of boundary patches, including patches 741 and 742.

At step 610, a boundary patch is selected from the identified collection of boundary patches for an iteration. At steps 630-640, a comparison is performed between the selected boundary patch and each source patch in the collection of source patches. For example, boundary patch 741 in FIG. 7 is compared with both source patches 751 and 752 and other patches (not depicted) of source region 750. The comparison is repeated until, at step 640, the process determines that all the source patches have been compared, and the process transitions to step 650.

At step 630, the selected boundary patch is compared with the selected source patch to yield a similarity value that measures the similarity between the selected boundary patch and the selected source patch. Since each channel of a patch may be represented as a dimension of a tensor, a patch may be represented as a multidimensional tensor. The similarity metric value for the selected boundary patch with the selected source patch may be calculated using tensor-based similarities and relying on only the known pixel data units of the respective patches.

In an embodiment, the similarity metric value may be calculated by calculating the Euclidian distance of the selected boundary and source patches. The process may calculate the distance between the multidimensional tensors of the selected boundary patch and the selected source patch. The distance may be represented based on Euclidian distance using the following example equation:

$$d_{p\hat{p}} = \frac{\left\|(\text{patch}_{X^t}^{k_m}(p) - \text{patch}_{X^t}^{k_m}(\hat{p})) \odot \text{patch}\frac{k_m}{M^t}(p)\right\|_2^2}{\text{sum}\left(\text{patch}\frac{k_m}{M^t}(p)\right)}$$

In one embodiment, for the selected boundary patch, the source patch having the least distance from the selected boundary patch is selected for the boundary patch. Hence, the best matched (smallest distance) source patch is given the highest similarity metric value, e.g., a probability value of one (1), while other source patches are given the lowest similarity metric value, e.g., a probability value of zero (0).

In another embodiment, each source patch of the source patch collection is assigned a similarity value for the selected boundary patch based on the calculated distance value for the selected patch with the selected boundary patch. For example, the Euclidian distance-based similarity values for the selected boundary patch may be determined by fitting to the opposite function $f(x) = -x$ or inverse function $f(x) = 1/(1+x)$.

In yet another embodiment, cosine similarity is used to determine the similarity values of the collection of source patches for the selected boundary patch. The cosine similarity assigns a higher value of similarity to the source patch, for which the corresponding multidimensional tensor has the smallest angle with the multidimensional tensor of the selected boundary patch. An example equation for calculating a cosine similarity-based similarity metric value is:

$$s_{p\hat{p}} = \left\langle \frac{\text{patch}_{X^t}^{k_m}(p) \odot \text{patch}\frac{k_m}{M^t}(p)}{\left\|\text{patch}_{X^t}^{k_m}(p)\right\|}, \frac{\text{patch}_{X^t}^{k_m}(\hat{p})}{\left\|\text{patch}_{X^t}^{k_m}(\hat{p})\right\|} \right\rangle$$

In an embodiment, continuing with FIG. 6, at step 650, similarity values of source patches for the selected boundary patch are modified to fit a distribution, i.e., normalized. The SoftMax function may be used to normalize the similarity values to have the probability distribution that sums to 1. Example equations for SoftMax function to derive probabilities for similarity metric values (e.g., distance, do) include:

$$P_{p\hat{p}} = \text{Softmax}\left(\{-d_{p\hat{p}} \mid \overline{M_{\hat{p}}^t} = 1\}\right)_{\hat{p}}, \text{ or}$$

$$P_{p\hat{p}} = \text{Softmax}\left\{\frac{1}{1+d_{p\hat{p}}} \mid \overline{M_{\hat{p}}^t} = 1\right\}_{\hat{p}}.$$

At step 650, the obtained probabilities are assigned as the corresponding similarity metric values of the source patches for the selected boundary patch. In another embodiment, the similarity values are not further normalized and are used directly for generating a replacement patch for the selected boundary patch.

Generating Replacement Patch

Continuing with FIG. 3, based on a comparison of a boundary patch with a collection of source patches, at step 350, the process generates a replacement patch for the boundary patch and applies the replacement batch to the boundary region. The replacement patch may be the same or different size than the source patches and, additionally or alternatively, may be based on multiple source patches. For example, the replacement patch may be generated based on the amount of each source patch's level of similarity with the boundary patch.

Continuing with FIG. 6, at step 660, the process generates a replacement patch for the selected boundary patch based on the similarity values of the source patch(es) for the selected boundary patch. In one embodiment, at step 662, the replacement patch for the selected boundary patch is generated based only on the source patch that has the highest similarity value for the selected boundary patch. To generate the replacement patch, the process selects the central pixel data unit of the best-matched source patch and, with the surrounding pixel data units (e.g., using only known pixel data units), generates a tensor having the specified size for replacement patches.

In an alternative embodiment, at step 664, the similarity value for each source patch is used to determine the amount of information used from each of the source patches when generating the replacement patch for the boundary patch. The source patches may be aggregated to yield a replacement patch for the selected boundary patch. When aggregating, the normalized similarity value for a source patch may be used as a weight in the aggregation. The corresponding channel values of each source patch are each weighted with the normalized similarity value of the source patch and then aggregated together. Accordingly, at step 664, the similarity value of a source patch for the selected boundary patch indicates the proportion of the source patch (by weighting the source patch's channel values with similarity values) to be included in the replacement patch of the boundary patch.

In yet another alternative embodiment, at step 666, the normalized similarity value of a particular source patch is the probability of that particular source patch being solely selected for the replacement patch. The source patches are randomly sampled for the replacement patch of the boundary patch using as sampling probabilities the corresponding normalized similarity values. To generate the replacement patch, the process selects the central pixel data unit of the selected source patch and, with the surrounding pixel data units (e.g., known pixel data units), generates a tensor having the size specified for replacement patches.

Applying Replacement Patches

At step 670, if the next boundary patch exists in the collection of boundary patches, the process proceeds to generate the next replacement patch for the next boundary patch by executing steps 610-660. If at step 670, the boundary patches have been exhausted for the boundary collection of the boundary region, the process proceeds to step 680, having generated a collection of replacement patches for the selected missing boundary region.

At step 680, the process applies the generated collection of replacement patches for the boundary region onto the boundary region of the input image data. In an embodiment, although the selected boundary patch may contain pixel data units that are outside the boundary region, each replacement patch is only applied to the pixel data units of the boundary region. When multiple replacement patches overlap the same boundary pixel data unit, the pixel data units from each of the replacement patches that correspond to the boundary pixel data unit are aggregated using an aggregation function such as an average.

For example, in FIG. 7, replacement patches 761 and 762 are generated from source patches 751 and 752, respectively. The replacement patches 761 and 762 overlap, although the replacement patches 761 and 762 have been generated for different boundary patches (and, thus, for different boundary central pixel data units). For a boundary pixel data unit in the overlapped region, the channel values of the boundary pixel data unit are determined by aggregating the corresponding channel values from both replacement patches 761 and 762.

In an embodiment, for each replacement patch in the generated collection of the replacement patches for the selected boundary region, the pixel data unit of the replacement patch that covers a boundary pixel data unit is added to the existing channel values of the boundary pixel. The channel values of the boundary pixel data unit are then divided by the number of replacement patches that have been applied to the boundary pixel data unit.

After the process has applied the collection of replacement patches for the selected boundary region at step 680, the process proceeds to step 370 of FIG. 3 and repeats steps 320-360 for the next missing boundary region. At step 370, if all the boundary regions have been considered and/or the number of iterations has been exhausted, the process proceeds to step 380.

Convolution

At step 380, the process performs convolution on the image data updated with the newly generated pixel data units. A convolution window of a specified size is selected, having weights in each location of the window and a specified central location for the window. The weights may be heuristically determined or trained as part of the machine learning model training described above.

When applying the convolution window to an area of the updated image data, the channel values of the pixel data units that are within the convolution window area are applied to the respective channel values of the pixel data unit to modify the pixel data units according to the corresponding weights (e.g., a dot product of the convolution window with the applied area of the image data). Accordingly, new channel values are calculated for the central location's pixel data unit, which are based on the channel values of the surrounding pixel data units and are according to the weights of the convolution window.

The convolution window may be applied to the image data such that each pixel data unit of the image data is modified.

In an embodiment, the updated image data (even after patch matching techniques described above) may still contain a missing region. In such an embodiment, at step 385, the process performs convolution such that no pixel data unit is used from the remaining missing region is used in the convolution.

One approach to avoid using unknown pixel data units from the remaining missing region is to dilate the remaining missing region mask, M T by the size (kernel size) of the convolution window, IQ, to produce a new remaining missing region mask: $M'=\text{dilate}(M^T, k_c)$.

The new missing region mask may then be subtracted (zeroed out) from the convolved image data, C:

$$C \leftarrow \text{Conv}(X^T, k_c \times k_c)$$

$$\text{Result} \leftarrow (C \odot M', M').$$

Thus, the resulting image data is the output image data (e.g., output image data 120), and the new remaining missing region mask is the mask for the remaining missing region mask (e.g., remaining missing region mask 125).

Continuing with FIG. 3, at step 390, the resulting image data is provided as an output image data, along with the remaining missing region mask, if any pixel data unit remains unknown. If there is no further image processing step, the output image data may be displayed or stored. If there are further image processing step(s), the output image data may be provided as input to such steps. For example, as described above, output image data 120 and remaining region mask 125 may be provided as input to other convolution layers of CNN 151.

Software Overview

Figure 8:
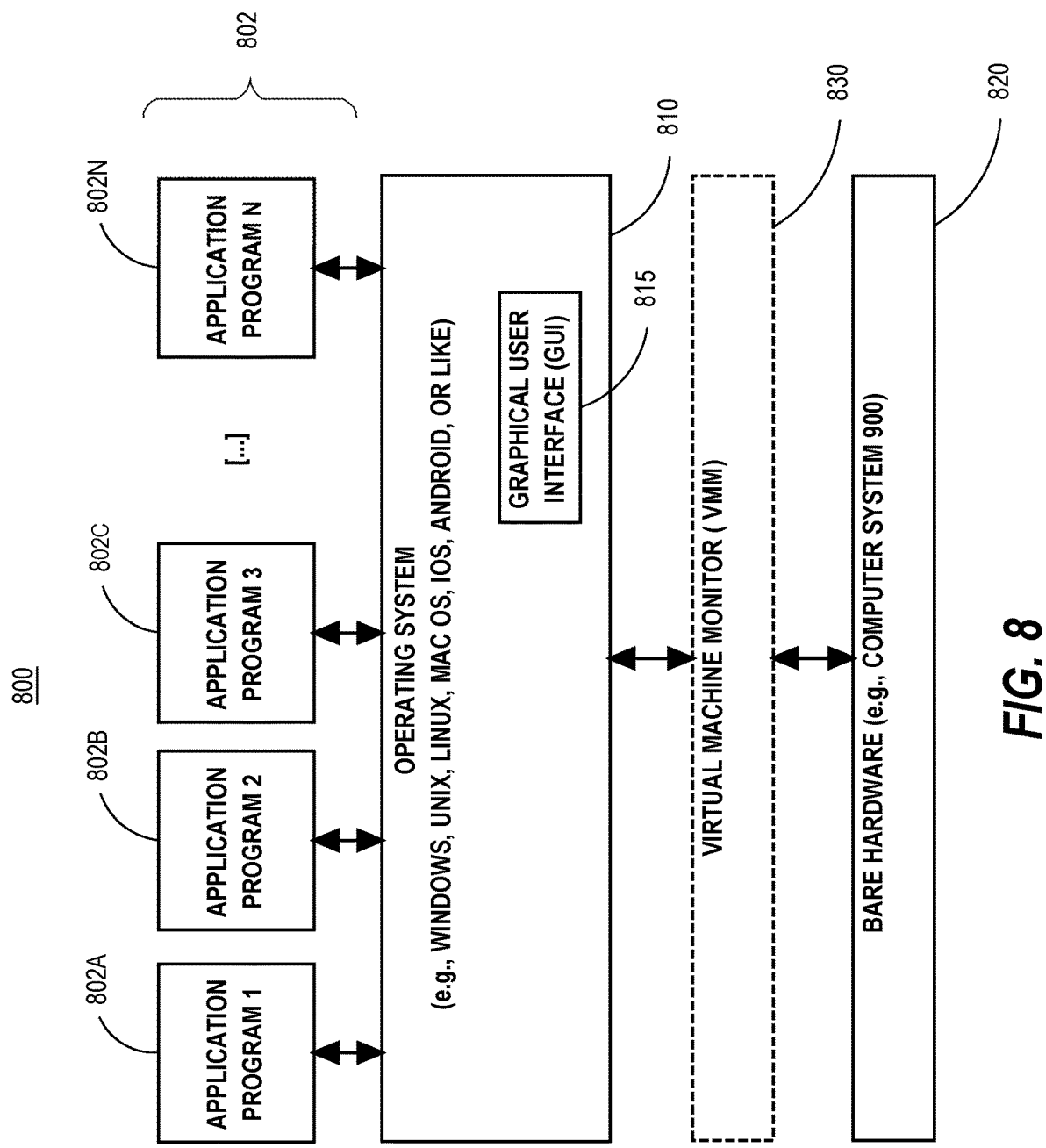
FIG. 8 is a block diagram of a basic software system, in one or more embodiments.
Figure 9:
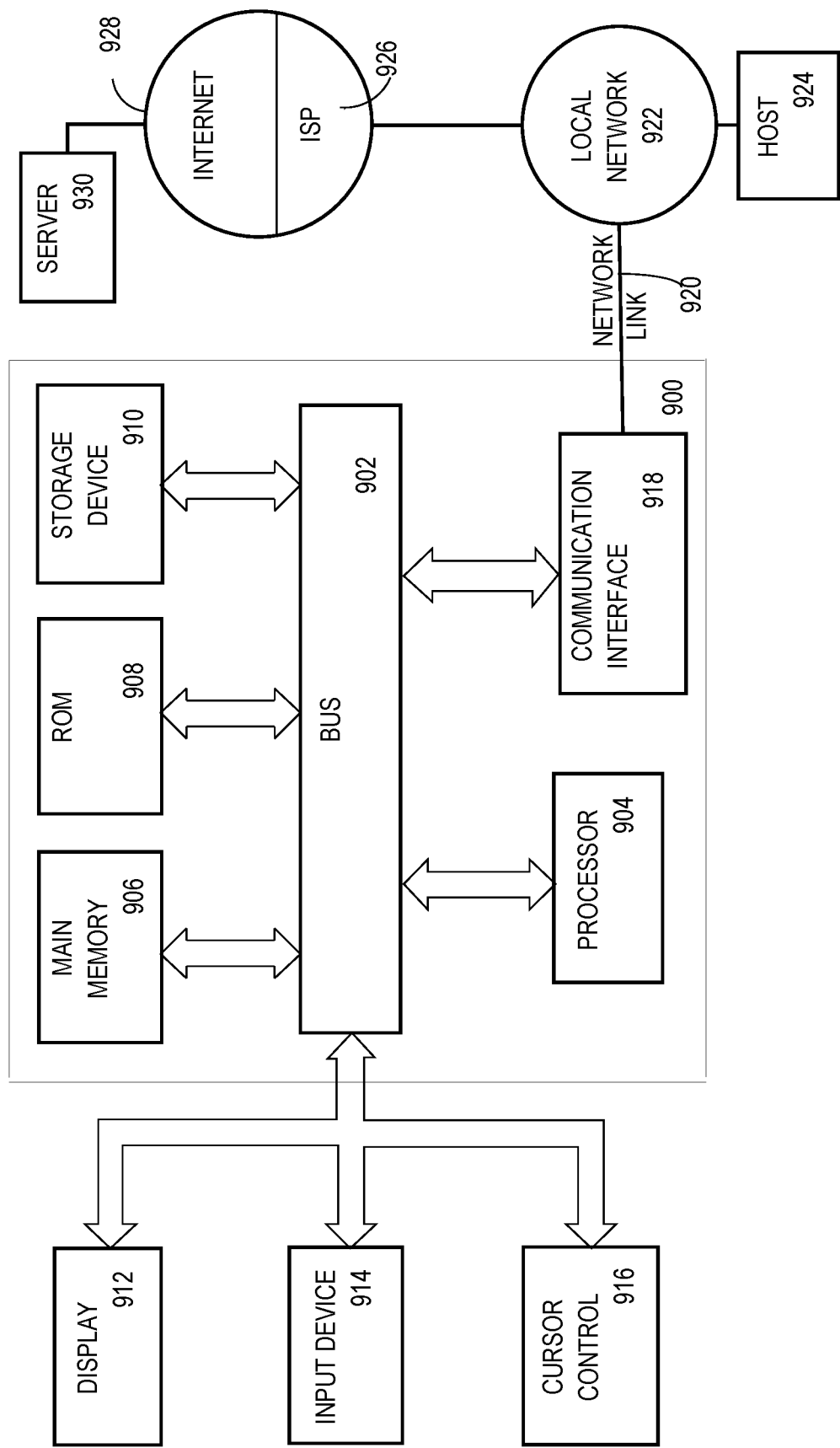
FIG. 9 is a block diagram that illustrates a computer system upon which an embodiment of the invention may be implemented.

FIG. 8 is a block diagram of a basic software system 800 that may be employed for controlling the operation of computing system 900 of FIG. 9. Software system 800 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or another online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department to instead be delivered as service layers within a cloud environment for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). In a cloud computing environment, there is no insight into the application or the application data. For a disconnection-requiring planned operation, with techniques described herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read-only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire, and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
for a first iteration of a plurality of iterations to perform inpainting for input image data, the input image data comprising a known region and a missing region, wherein the known region comprises a plurality of known pixel data units and the missing region comprises a plurality of unknown pixel data units:
determining a first missing boundary region of the input image data that is part of the missing region and includes a first set of boundary unknown pixel data units from the plurality of unknown pixel data units,
generating first source pixel data based, at least in part, on one or more of the plurality of known pixel data units, and
based, at least in part, on the first source pixel data, generating a first replacement pixel data unit to replace a first unknown pixel data unit of the first set of boundary unknown pixel data units of the first missing boundary region;
for a second iteration of the plurality of iterations:
determining a second missing boundary region of the input image data that is part of the missing region and includes a second set of boundary unknown pixel data units from the plurality of unknown pixel data units and that excludes the first set of boundary unknown pixel data units of the first missing boundary region,
generating second source pixel data based, at least in part, on one or more of the plurality of known pixel data units, and based, at least in part, on the second source pixel data, generating a second replacement pixel data unit to replace a second unknown pixel data unit of the second set of boundary unknown pixel data units of the second missing boundary region.

2. The method of claim 1, further comprising:
receiving mask data, the mask data comprising a plurality of mask unknown pixel data units and a plurality of mask known pixel data units;
wherein the plurality of mask unknown pixel data units have a first value that indicates that a corresponding plurality of image data units are part of the missing region of the input image data;
wherein the plurality of mask known pixel data units have a second value, different from the first value, that indicates that a corresponding plurality of pixel data units in the input image data are part of the known region of the input image data.

3. The method of claim 2, further comprising:
determining a first boundary mask data at least by:
performing an erosion window sliding on the mask data thereby generating eroded mask data, the performing comprising assigning a center mask pixel data unit of the erosion window to a minimum value of pixel data units in the erosion window, and
generating the first boundary mask data, at least, by determining difference of the eroded mask data and the mask data;
determining the first missing boundary region by selecting one or more pixel data units that correspond to one or more pixel data units of the first boundary mask data, thereby, selecting the first set of boundary unknown pixel data units of the input image data for the first missing boundary region.

4. The method of claim 1, wherein the first set of boundary unknown pixel data units encompasses the second set of boundary unknown pixel data units.

5. The method of claim 1, wherein the second set of boundary unknown pixel data units encompasses the first set of boundary unknown pixel data units.

6. The method of claim 1, wherein the second set of boundary unknown pixel data units are adjacent to the first set of boundary unknown pixel data units.

7. The method of claim 1, further comprising:
performing an additional iteration of the plurality of iterations until determining that a corresponding additional missing boundary region of the input image data encompasses no pixel data unit from the plurality of unknown pixel data units.

8. The method of claim 1, further comprising:
performing a particular convolution on the input image data having a plurality of replacement pixel data units that includes the first replacement pixel data unit and the second replacement pixel data unit by a sliding window of weights, thereby generating output image data;
wherein weights of the sliding window of weights are determined by training a machine learning algorithm that includes the particular convolution to generate a machine learning model that includes the sliding window of weights.

9. The method of claim 1, further comprising:
generating first boundary pixel data based, at least in part, on the first unknown pixel data unit of the first set of boundary unknown pixel data units from the plurality of unknown pixel data units;

based, at least in part, on the first source pixel data and the first boundary pixel data, generating the first replacement pixel data unit to replace the first unknown pixel data unit of the first set of boundary unknown pixel data units of the first missing boundary region.

10. The method of claim 1, further comprising:
receiving original image data that is different from the input image data;
performing, on the original image data, one or more convolutions from a plurality of convolutions of a machine learning model thereby generating the input image data from the original image data.

11. A system comprising one or more processors and one or more storage media storing a set of instructions, which, when executed by the one or more processors, causes:
for a first iteration of a plurality of iterations to perform inpainting for input image data, the input image data comprising a known region and a missing region, wherein the known region comprises a plurality of known pixel data units and the missing region comprises a plurality of unknown pixel data units:
determining a first missing boundary region of the input image data that is part of the missing region and includes a first set of boundary unknown pixel data units from the plurality of unknown pixel data units,
generating first source pixel data based, at least in part, on one or more of the plurality of known pixel data units, and
based, at least in part, on the first source pixel data, generating a first replacement pixel data unit to replace a first unknown pixel data unit of the first set of boundary unknown pixel data units of the first missing boundary region;
for a second iteration of the plurality of iterations:
determining a second missing boundary region of the input image data that is part of the missing region and includes a second set of boundary unknown pixel data units from the plurality of unknown pixel data units and that excludes the first set of boundary unknown pixel data units of the first missing boundary region,
generating second source pixel data based, at least in part, on one or more of the plurality of known pixel data units, and
based, at least in part, on the second source pixel data, generating a second replacement pixel data unit to replace a second unknown pixel data unit of the second set of boundary unknown pixel data units of the second missing boundary region.

12. The system of claim 11, wherein the set of instructions includes instructions, which, when executed by the one or more processors, cause:
receiving mask data, the mask data comprising a plurality of mask unknown pixel data units and a plurality of mask known pixel data units;
wherein the plurality of mask unknown pixel data units have a first value that indicates that a corresponding plurality of image data units are part of the missing region of the input image data;
wherein the plurality of mask known pixel data units have a second value, different from the first value, that indicates that a corresponding plurality of pixel data units in the input image data are part of the known region of the input image data.

13. The system of claim 12, wherein the set of instructions includes instructions, which, when executed by the one or more processors, cause:

determining a first boundary mask data at least by:
  performing an erosion window sliding on the mask data thereby generating eroded mask data, the performing comprising assigning a center mask pixel data unit of the erosion window to a minimum value of pixel data units in the erosion window, and
  generating the first boundary mask data, at least, by determining difference of the eroded mask data and the mask data;
determining the first missing boundary region by selecting one or more pixel data units that correspond to one or more pixel data units of the first boundary mask data, thereby, selecting the first set of boundary unknown pixel data units of the input image data for the first missing boundary region.

14. The system of claim 11, wherein the first set of boundary unknown pixel data units encompasses the second set of boundary unknown pixel data units.

15. The system of claim 11, wherein the second set of boundary unknown pixel data units encompasses the first set of boundary unknown pixel data units.

16. The system of claim 11, wherein the second set of boundary unknown pixel data units are adjacent to the first set of boundary unknown pixel data units.

17. The system of claim 11, wherein the set of instructions includes instructions, which, when executed by the one or more processors, cause:
  performing an additional iteration of the plurality of iterations until determining that a corresponding additional missing boundary region of the input image data encompasses no pixel data unit from the plurality of unknown pixel data units.

18. The system of claim 11, wherein the set of instructions includes instructions, which, when executed by the one or more processors, cause:
  performing a particular convolution on the input image data having a plurality of replacement pixel data units that includes the first replacement pixel data unit and the second replacement pixel data unit by a sliding window of weights, thereby generating output image data;
  wherein weights of the sliding window of weights are determined by training a machine learning algorithm that includes the particular convolution to generate a machine learning model that includes the sliding window of weights.

19. The system of claim 11, wherein the set of instructions includes instructions, which, when executed by the one or more processors, cause:
  generating first boundary pixel data based, at least in part, on the first unknown pixel data unit of the first set of boundary unknown pixel data units from the plurality of unknown pixel data units;
  based, at least in part, on the first source pixel data and the first boundary pixel data, generating the first replacement pixel data unit to replace the first unknown pixel data unit of the first set of boundary unknown pixel data units of the first missing boundary region.

20. The system of claim 11, wherein the set of instructions includes instructions, which, when executed by the one or more processors, cause:
  receiving original image data that is different from the input image data;
  performing, on the original image data, one or more convolutions from a plurality of convolutions of a machine learning model thereby generating the input image data from the original image data.

* * * * *